Patented May 13, 1947

2,420,570

UNITED STATES PATENT OFFICE 2,420,570

DENTAL RESTORATION, INCLUDING ARTIFICIAL TEETH AND DENTURES

Max S. Shapiro, Brooklyn, N. Y.

Application November 29, 1941, Serial No. 420,922

5 Claims. (Cl. 32—8)

1

My invention relates to a new and improved dental restoration, including artificial teeth, and dentures of all kinds.

One of the objects of my invention is to provide improved plastic compositions for making such dental restorations.

Another object of my invention is to provide combination or composite dental restorations, which have varying degrees of hardness and resilience in respective parts thereof, in order to follow the structure of natural teeth and their attachments.

Another object of my invention is to provide a new and improved substitute for porcelain, and more specifically in place of dental porcelain, in making artificial teeth and other dental restorations.

This application is a continuation in part of my application Serial No. 369,446, filed on December 10, 1940.

Other objects of my invention will be stated in the annexed description and drawings which disclose a preferred embodiment thereof, it being understood that the above statement of the objects of my invention is intended generally to explain the same without limiting it in any manner.

Figure 1:
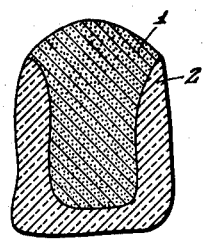
Fig. 1 is a facial view of an anterior tooth, partially in section.
Figure 3:
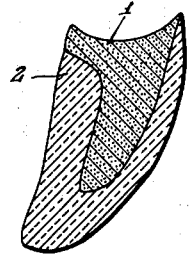
Fig. 3 is a side view of Fig. 1.

It is well known that a tooth generally consists of the following parts:

a. The enamel, which is a vitreous substance, which completely covers the crown.

b. The cementum, which is a bony substance which envelops the root of the tooth.

c. The dentin, which is less dense than the enamel, and which is harder than bone, and forms the interior body of the tooth.

d. The pulp, which is a small mass of soft tissue, which occupies a central cavity within the crown and the root. The nerve and blood vessels are located in the pulp.

e. The pericementum or peridental membrane, which is a fibrous membrane which covers the cementum of the root.

The enamel is the hardest substance in the

2 tooth and it varies in hardness in different human beings. The enamel is generally classified as the hard sclerotic type, the medium sclerotic type and the soft malacotic type.

The dentin is a dense and highly elastic substance, whose color is white or yellowish-white and it is translucent to some extent.

The peridental membrane, in addition to connecting and attaching the root of the tooth to the alveolus, also acts as an elastic cushion or buffer between the root and the alveolus, so that said membrane prevents injury from the shock and strain which is produced by mastication.

It is an important object of my invention to provide artificial teeth and dental restorations which will correspond in structure and function to the structure and function of natural teeth. Heretofore artificial teeth have been made commercially of porcelain, and rigid materials have been used in making the base portions of dental restorations.

I have discovered that by modifying certain plastic compounds, I can produce various compounds which have different degrees of hardness and resilience, similar to the hardness and resilience of dentin, of enamel, and of the peridental membrane. By using these compounds, I can produce artificial teeth and other dental restorations, which have the substantial functional and physical characteristics of natural teeth. Said modified plastic compounds consist largely of an acrylic ester. Said acrylic ester may and preferably does, comprise more than 50% by weight of the improved composition or compound. Said improved compositions or compounds also contain minor portions of certain minerals, pigments, abrasives, and coloring matter. The invention is not limited to the use of all said minor ingredients, in a tooth or dental restoration which is made according to my invention. The aforesaid acrylic esters are polymerized under heat and pressure. The invention generally includes the acrylic esters and the vinyl esters, but it is not restricted to these classes of esters.

The hardness and resiliency and the transparence and the color of the artificial tooth or dental restoration depends upon the following factors:

a. The type of monomer and the type of polymer which are used, and the respective proportions of said monomer and polymer in the improved composition.

b. The type of mineral, pigment, abrasive, and coloring matter, and the respective proportions of said minor ingredients in the final polymerized plastic.
  c. The period of polymerization.
  d. The temperature and pressure under which the ester is processed or polymerized.
  e. The character and the material of the mold.
  f. The type of plasticizer which is used.

Without limiting the invention to the ingredients or combinations of ingredients or to the proportions stated herein, the following practical working examples are given.

Example 1

The ingredients consist of 60 cc. of liquid or unpolymerized methyl methacrylate monomer (whose specific gravity is 0.94 at 20° C.), 180 grams of solid granulated polymerized methyl methacrylate, 1-2 grams of feldspar, 0.5 gram of silica, 0.5-1 gram of silicon carbide, 1-3 grams of tungsten trioxide, 1-2 grams of oil of cajaput or other oil whose specific gravity is 0.8 or more.

A suitable small percentage of an oil-soluble dye of any color is dissolved in the oil.

The weight of the liquid monomer is 56.40 grams, so that the total weight of the unpolymerized material and of the polymerized material is 236.40 grams.

The minimum total weight of the other ingredients is 4 grams. The feldspar therefore comprises about .4%–.8% of the entire composition. The percentage of the other ingredients, with the exception of the pigment, is less than the percentage of the feldspar.

The silica is preferably of the quartz variety, although I can use other types of silicon dioxide. The tungsten trioxide ($WO_3$) is a yellow or yellow-orange powder. The feldspar is preferably of the orthoclase variety, although I can use other varieties of feldspar, including albite. I can also use leucite and natrolite as varieties of feldspar. The feldspar and silica and silicon carbide and the tungsten trioxide should be in very finely divided powdered form.

The method of intermixing and working these ingredients is as follows:

The liquid unpolymerized methyl methacrylate monomer is poured into a vessel which is made of suitable inert material, such as glass and the like. The dye solution in the oil is then intermixed with the liquid monomer, so as to secure a uniform solution. The other ingredients, namely, the feldspar, the silica, the silicon carbide, the tungstic oxide and the granulated polymerized methyl methacrylate are uniformly intermixed so as to produce a homogeneous mixture, in any suitable mixing vessel. This intermixed batch is now added to the liquid monomer in which the oil and dye have already been dissolved, with constant intermixing so as to produce a homogeneous mass. This mass is plastic so that it can be readily shaped. This plastic mass is allowed to stand for a period of five minutes to ten minutes in order to form a putty-like mass. This mass is then set by polymerizing the monomer, in a suitable mold, using heat and pressure. If only a tooth is to be formed, a metal die or mold can be used. If it is desired to make a denture, the mold is made of artificial stone, or of a mixture of artificial stone and plaster of Paris. If the mold is made of artificial stone or of a mixture of plaster of Paris and artificial stone, said mold must be properly tin-foiled. The putty-like composition is packed into the mold, which is heated to a temperature of 180°–240° F., while the material is maintained under a pressure of 500 lbs.– 1000 lbs. per square inch. The time of heating at said temperature and pressure is for a period of 30 minutes to 60 minutes. The molding temperature of 180° F.–240° F. is below the temperature at which plaster of Paris disintegrates, and it is also below the temperature of about 482° F., at which temperature the methyl methacrylate polymer begins to depolymerize or to revert to the monomer.

The function of the feldspar is to give the tooth or denture the required translucence and hardness. The function of the silica is to impart opacity to the composition. Therefore, in making a tooth, the composition is not necessarily uniform. Certain parts of a natural tooth are more opaque than other parts. The composition for making the more opaque parts of the tooth can therefore have silica therein in varying small proportions, and the part of the tooth which is to be substantially translucent may have little or no silica therein. The function of the silicon carbide is to give the artificial tooth grinding power and strength. The tungsten trioxide is a pigment which increases the hardness of the composition and which also imparts a yellowish color tone thereto, in order to simulate a natural tooth. The filling ingredients are inert.

Likewise, the composition above mentioned may be varied as to color tone or shade, since the base of a denture is usually of a red or pink color. The composition which is used for making the base of the denture may therefore have cadmium red, instead of the tungsten trioxide.

Instead of using methyl methacrylate monomer, I can use other monomers and I can also use polymethacrylic acid. Likewise, I can use a mixture of equal parts by volume of methyl methacrylic monomer and vinyl acetate.

If I mold a tooth form in a metal die or mold, said die or mold should be highly polished and the composition may be heated in said metal die or mold at a pressure of 1000 lbs. per square inch to 3000 lbs. per square inch, at a temperature of 180°–240° F., for a period of 30–90 minutes.

I can also omit the use of the granulated polymerized methyl methacrylate. In such case, this is replaced by a larger volume of the liquid monomer. The mixture thus made is poured or injected into a glass mold whereby it is heated during a period of one to two hours or longer at a temperature of 120°–200° F. under low pressure, which will not exceed the breaking strength of the glass mold. In such case, the weight of the original liquid monomer is at least 96% of the weight of the moldable base material. The composition of the final product is the same as if the polymerized ester was used as previously stated.

In order to hasten the polymerization, in any of the examples above mentioned, I can add .005% (five thousandths per cent) of benzoyl peroxide, or any other suitable oxidizing accelerator.

The methyl methacrylate monomer and allied products which can be utilized, are disclosed in various United States patents, such as Nos. 1,980,483, 2,013,295, 2,084,399, 2,086,093, 2,120,006, 2,125,885, 2,160,937, 2,104,168, 2,087,468, 2,073,619, 2,114,233, 2,129,478.

These patents disclose esters of acrylic and methacrylic acids, polymerized alone, or polymerized in admixture with each other or with derivatives of these acids, or with other polymerizable substances. These substances also generally include the esters of the alkacrylic acids, such as monomeric acrylates and various alkacrylates. The methyl methacrylate is also designated as an acrylic methyl ester. The invention is not limited to esters of alpha methacrylic acid, and it includes the ethyl esters as well as the methyl esters.

Instead of using oil of cajaput, I can use turpentine oil, castor oil, pine-cone oil, and pine-needle oil.

Natural teeth come in many different shadings and there is no fixed rule upon this point. I can simulate the different shadings of natural teeth, and the different shadings of parts of natural teeth, and the different shadings of the base portions of the dentures by using various dyes or pigments, including lakes.

The specific gravity of the heavy oil which I use should not be less than 0.8.

The base part of the denture may consist only of the polymerized ester, with enough feldspar to impart hardness, and a suitable organic dye or inorganic dye or pigment.

In the final complete denture, the polymerized ester is at least 90% by weight of the base and of the tooth or teeth which are integral with said base, and it should be from 90%–96% by weight. The composition of the base and of the tooth or teeth is substantially the same, save for differences in coloring matter, and differences in minor ingredients, such as silica, silicon carbide, etc. When an article is made according to my invention by polymerizing a plurality of different compositions in situ, the respective members or elements which are thus produced have coalesced abutting faces, at which said members or elements are integral.

The polymerized esters previously mentioned have already been used for making denture bases alone, but porcelain teeth have been commercially used in conjunction with said bases.

In the finished product, no line of mechanical division can be detected between the base and the tooth or teeth. Likewise, when a tooth is made according to the invention with a plurality of layers, no line of mechanical division can be detected between said layers. Hence, the abutting walls of said layers have coalesced. Each molding composition includes at least some acrylic ester which is not polymerized to final condition. Hence, each molding composition is polymerized in situ to final condition.

*Example 2*

The ingredients consist of the following:

0.25%–0.50% by weight of zinc oxide or titanium oxide, 94%–98% by weight of granulated and polymerized methyl methacrylate, 1.50%–5% by weight of silica, of 230 mesh, 0.25%–0.50% by weight of silicon carbide or any other abrasive of substantially the same hardness, traces of tungsten trioxide, and of yellow ochre or any other pigment or coloring matter.

In contrast with Example 1, the liquid or unpolymerized ester is not used in Example 2. Also, in Example 2, no feldspar is used.

The ingredients specified in Example 2 are thoroughly intermixed and from 50–70% by weight of said mixture is added to 50–30% by weight of glycol dimethacrylate monomer, in order to form a plastic composition. This plastic composition will produce a hard product, which is like porcelain and which is similar to enamel, when said plastic composition is heated at a temperature of 180°–240° F., and at a pressure of 1000–3000 pounds per square inch, for a period of 30 to 120 minutes. Glycol dimethacrylate monomer may be considered as being a derivative of an acrylic ester. Hence, when I refer to a polymerized acrylic ester in a claim or claims, I include the polymerized products which are derived from suitable derivatives of such acrylic esters.

*Example 3*

The ingredients are as follows:

94%–98% by weight of polymerized methyl methacrylate, which is either granulated or powdered, 1.5%–5% by weight of silica of about 230 mesh, .5%–1% by weight of zinc oxide or titanium oxide, a trace of feldspar, and a trace of yellow ochre or any other pigment or coloring matter.

The above ingredients are thoroughly intermixed and about 67% by weight of said mixture is intermixed with 33% by weight of methyl methacrylate monomer, in order to form a plastic material. This material is polymerized at a temperature of 180°–240° F., and at a pressure of 1000–3000 pounds per square inch, for a period of 30 to 60 minutes. The final polymerized plastic composition will produce a softer and more resilient product, than the product which results from Example 2. Therefore, the product of Example 3 is similar to dentin, as distinguished from the enamel-like product of Example 2.

*Example 4*

The ingredients are as follows:

98%–99% by weight of granulated polymerized methyl methacrylate, .5%–1% by weight of zinc oxide or titanium oxide, .5%–1% by weight of yellow ochre or other pigment or coloring matter.

Said ingredients are thoroughly intermixed and said mixture is then intermixed with methyl methacrylate monomer or ethyl methacrylate monomer, in order to form a plastic mass. Said plastic mass contains from 25%–30% by weight of either monomer.

This composition is then processed at a temperature of 180°–240° F., and at a pressure of 1000–3000 pounds per square inch for a period of 30 to 60 minutes.

The final product is softer than dentin.

In Fig. 1, the central part 1 is analogous to dentin, and it consists of the type of composition which is disclosed in Examples 3 and 4. The outer portion 2 of the artificial anterior tooth is similar to enamel, and it is made of a composition which is disclosed in Examples 1 and 2.

Figure 2:
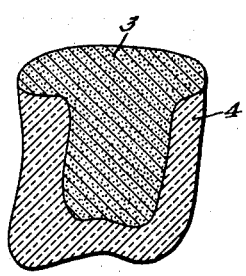
Fig. 2 is a buccal view of a posterior tooth, partially in section.
Figure 4:
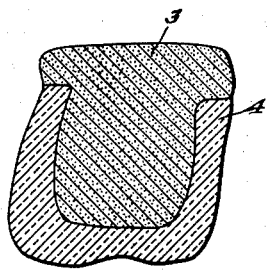
Fig. 4 is a side view of Fig. 2.

In Fig. 2, the central portion 3 is made of a composition similar to dentin, as disclosed in Examples 3 and 4. The outer portion or surface layer 4 is similar to enamel and it is made of the type of composition which is disclosed in Examples 1 or 2, depending upon the degree of hardness of said enamel-like composition.

Figure 6:
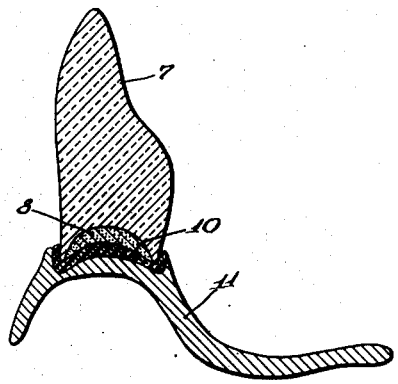
Fig. 6 is a cross-section of a dental restoration which includes a plate.

Fig. 6, which is a sagittal section, shows a tooth portion 7 which is made of the type of composition which is illustrated in Examples 1 and 2. The cushioning portion 8 may be made of relatively soft and resilient material, of the type shown in Examples 3 and 4. The layer 10 can be made of more resilient material than the portion 8. Layer 10 is made according to Example 4, by using ethyl methacrylate monomer, instead of methyl methacrylate monomer. That is, in Example 4, the use of ethyl methacrylate monomer produces a more resilient and less hard composition, as compared with the use of methyl methacrylate monomer. A composition made according to Example 4 with the use of ethyl methacrylate monomer is analogous to the peridental membrane.

The base portion 11 of the denture which is shown in Fig. 6 is made of the compositions set forth in Examples 1, 3 or 4, depending on the desired hardness. A red pigment or coloring matter may be used to simulate the natural color of the gum.

Figure 5:
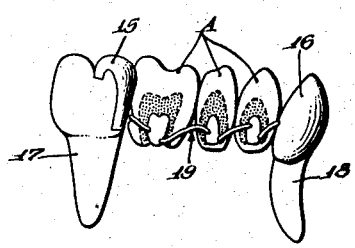
Fig. 5 is a front view illustrating the construction of a fixed bridge according to my invention.

Fig. 5 shows a fixed bridge which consists of two metal abutments 15 and 16 which are attached to respective natural teeth 17 and 18. The three artificial teeth A are attached to a metallic bar 19, which is fixed to said abutments 15 and 16. Each of the teeth A has a central portion which is made of the type of composition which is disclosed in Example 4. The outer portion of each tooth A is made of the type of composition which is disclosed in Examples 1 and 2.

Whenever I refer to an acrylic ester, in a claim or claims, it is to be understood that I include equivalent substances.

It is one of the important features of my invention that the base of the denture is made of a composition which consists largely, or in a proportion of more than 50%, of one of the types of polymerized esters which are specified herein.

In Examples 2–4 inclusive, the respective plastic compositions simulate the appearance of a natural tooth, with the total or substantial elimination of feldspar. In examples 2 and 3, the silica acts as hardening agent, in order to increase the hardness of the polymerized plastic.

Example 4 substantially omits the use of a hardening ingredient or of an abrasive ingredient.

I claim:

1. A composite artificial tooth, said tooth having a face portion and also having an inner portion, said face portion and said inner portion being made of respective polymerized compositions, each said composition comprising a major proportion of a polymerized acrylic ester, said compositions having been polymerized in situ to their final polymerization condition, said face portion and said inner portion having coalesced abutting faces, said tooth being substantially free from feldspar, said face portion having a minor proportion of hardening material and being harder and less resilient than said inner portion, said face portion and said inner portion being integral at said abutting faces.

2. An artificial tooth which has an outer portion and an inner portion, said portions being coalesced and integral at their junction, each said portion comprising a major proportion of a polymerized acrylic ester which has been polymerized in situ to final polymerized condition, said outer portion having hardening material in sufficient proportion so that the hardness of said outer portion is substantially the hardness of tooth enamel, the hardness of said inner portion being less than the hardness of said outer portion and approximating the hardness of tooth dentin.

3. A dental restoration comprising a base portion which is molded integral with a tooth or teeth, each said tooth being connected to said base portion by an intermediate portion which is less hard and more resilient than the face portion of the respective tooth, each said face portion being coalesced and integral with the respective intermediate portion at the respective junction, each said intermediate portion being coalesced with said base portion at the respective junction, each said face portion and said intermediate portion and said base portion comprising a major proportion of a polymerized acrylic ester which has been polymerized in situ to final condition.

4. A tooth according to claim 2, in which said acrylic ester has been polymerized in situ at a temperature which does not exceed substantially 240° F.

5. A dental restoration according to claim 3, in which said polymerized acrylic ester has been polymerized in situ at a temperature which does not exceed substantially 240° F.

MAX S. SHAPIRO.

REFERENCES CITED

The following references are of record in the file of this patent:

UNITED STATES PATENTS

| Number | Name | Date |
| --- | --- | --- |
| 2,163,014 | Voigt | June 20, 1939 |
| 1,105,476 | Withycombe | July 28, 1914 |
| 1,384,282 | Tuttle | July 12, 1921 |
| 1,333,007 | Withycombe | Mar. 9, 1920 |
| 1,219,019 | Magnus | Mar. 13, 1917 |
| 1,223,450 | Van Allen | Apr. 24, 1917 |
| 589,385 | Dennett | Aug. 31, 1897 |
| 2,230,164 | Myerson | Jan. 28, 1941 |
| 2,234,993 | Vernon et al. | Mar. 18, 1941 |

FOREIGN PATENTS

| Number | Country | Date |
| --- | --- | --- |
| 568,573 | Germany | Jan. 21, 1933 |
| 435,536 | Great Britain | June 23, 1934 |

OTHER REFERENCES

Modern Plastics Catalog & Directory, Oct. 1936, page 108½.

Journal American Dental Assoc., vol. 29, April 1942, pages 640–647.

"Prosthetic Dentistry," J. H. Prothero, 3rd ed. 1923, pp. 426, 535, 537.

"Application of Synthetic Plastics," G. Ehlers, Kunstsloffe, Apr. 1938, vol. 28, #40, pp. 96–97.